United States Patent Office 3,847,838
Patented Nov. 12, 1974

3,847,838
ANTISTATIC DISPERSION COMPRISING AT LEAST TWO KINDS OF ORGANIC SOLVENTS
Teiji Habu, Kyusaku Yoshida, and Kazuo Takahashi, Tokyo, Japan, assignors to Konishiroku Photo Industry Co., Ltd., Chuo-ku, Tokyo, Japan
No Drawing. Filed Apr. 11, 1972, Ser. No. 243,449
Claims priority, application Japan, Apr. 17, 1971, 46/23,826
Int. Cl. G03c 1/82
U.S. Cl. 252—500                       5 Claims

ABSTRACT OF THE DISCLOSURE

An antistatic dispersion is disclosed which is a protective colloid solution, such as, for example, gelatin, agar or polyvinyl alcohol having dispersed therein a solution of an antistatic agent in at least two kinds of organic solvents which are substantially immiscible in water and which are lower in specific gravity than the protective colloid substance. Suitable antistatic agents include quaternary ammonium or phosphonium salts and the suitable solvents include phthalate and pyrrolidone type solvents and monohydric and polyhydric alcohols of high boiling point and low specific gravity.

---

This invention relates to a novel antistatic dispersion capable of imparting excellent antistatic characteristic to insulators.

Generally, it is considered that the charging of an insulator is chiefly a surface phenomenon. That is, it is considered that mechanical energy, which has been applied to an insulator when it is contacted or rubbed on the surface with a certain material or when a certain material is peeled off the surface, is converted into electrical energy, whereby static electricity is generated to electrify the insulator. Accordingly, the greater the amount of mechanical energy applied, the larger the amount of static electricity generated. However, the charging phenomenon varies depending on the kind of material with which the insulator is contacted or rubbed, and thus charging is an extremely complex phenomenon.

The above-mentioned charging of insulators brings about markedly serious drawbacks in the fields where insulators are utilized, and has fatal influence on such susceptible materials as light-sensitive photographic materials. That is, the generation of static electricity in light-sensitive photographic materials frequently results in the formation of so-called static marks. Since the static marks cannot be found unless the photographic materials have been developed, the generation of static electricity is an extremely troublesome phenomenon.

The present invention provides an antistatic dispersion for preventing insulators from electrification as mentioned above. The dispersion of the present invention exhibits not only an excellent antistatic effect, but in addition the antistatic effect is not degraded even when the dispersion is subjected to water-washing or development and also is not affected by such environmental conditions as temperature, humidity and the like. Moreover, the dispersion does not deteriorate in transparency during storage.

The antistatic dispersion of the present invention is prepared by dispersing in a protective colloid solution a solution formed by dissolving an antistatic agent in at least two kinds of substantially water-immiscible organic solvents lower in specific gravity than the protective colloid, each of the said organic solvents being at least one member selected from either one of the groups A and B mentioned later. The dispersion of the present invention is coated on or incorporated into an insulator, or an insulator is dipped in the composition, to make it possible to obtain an insulator having an excellent antistatic effect which is entirely free from such drawbacks as mentioned previously. In forming the above-mentioned antistatic agent solution, the antistatic agent may be dissolved in a mixed solvent comprising at least two of the aforesaid solvents, or may be dissolved in one solvent followed by addition of the other solvent.

The antistatic dispersion according to the present invention is effectively applicable to such susceptible materials as light-sensitive photographic materials. For example, when the dispersion is formed into the upper-most layer of a light-sensitive photographic material, the photographic material is completely prevented from electrification phenomenon due to contact or friction with or peeling from other members (e.g. members inside a camera, light-sensitive photographic materials, etc.) and the antistatic effect does not deteriorate due to development and like treatments. Accordingly, when the present composition is incorporated into any of the layers of a light-sensitive photographic material, the charging phenomenon occurring during the manufacture of the photographic material can be prevented.

Antistatic agents which can be used in the present invention are inclusive of many known compounds such as quaternary ammonium salts, quaternary phosphonium salts, etc. However, compounds which are particularly excellent as the antistatic agents are those of the formulas (I) and (II), $$R_2-\overset{\overset{R_1}{|}}{\underset{\underset{R_3}{|}}{N}}{}^{\oplus}-N^{\ominus}-COR_4 \quad (I)$$

$$\left[R_2-\overset{\overset{R_1}{|}}{\underset{\underset{R_3}{|}}{N}}-NHCOR_4\right]^+ A^- \quad (II)$$

wherein $R_1$, $R_2$ and $R_3$ are individually an alkyl group or an aralkyl group; $R_4$ is hydrogen, an alkyl group, an aryl group or a hetero ring; A is $XO_4$, X or $BX_4$, where X is a halogen atom.

Typical examples of the compounds of the general formulas (I) and (II) are as set forth in the following tables:

COMPOUNDS OF THE GENERAL FORMULA (I)

| Exemplification number | $R_1$ | $R_2$ | $R_3$ | $R_4$ |
|---|---|---|---|---|
| 1 | $CH_3$ | $CH_3$ | $CH_3$ | $C_9H_{19}-$ |
| 2 | $CH_3$ | $CH_3$ | $CH_3$ | $C_{11}H_{23}-$ |
| 3 | $CH_3$ | $CH_3$ | $CH_3$ | $C_{15}H_{31}-$ |
| 4 | $CH_3$ | $CH_3$ | $CH_3$ | 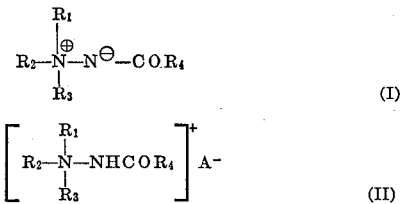 |
| 5 | $CH_3$ | $CH_3$ | $CH_3$ | 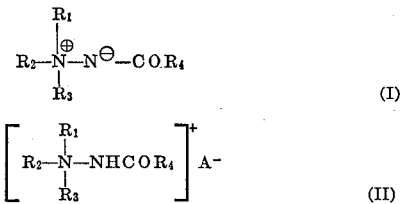 |
| 6 | $CH_3$ | $CH_3$ | $C_2H_5$ | $C_{15}H_{31}-$ |
| 7 | $CH_3$ | $CH_3$ | $C_{12}H_{25}$ | $CH_3-$ |

TABLE—Continued

| Exemplification number | $R_1$ | $R_2$ | $R_3$ | $R_4$ |
|---|---|---|---|---|
| 8 | $CH_3$ | $CH_3$ | $-CH_2-\phenyl$ | $C_{15}H_{31}-$ |
| 9 | $CH_3$ | $CH_3$ | $-CH_2-\phenyl(Br)$ | $C_5H_{11}-$ |
| 10 | $CH_3$ | $C_2H_5$ | $C_2H_5$ | $C_{11}H_{23}-$ |
| 11 | $C_2H_5$ | $C_2H_5$ | $C_2H_5$ | $C_{15}H_{31}-$ |
| 12 | $CH_3$ | $CH_3$ | $C_8H_{17}-$ | $C_7H_{15}-$ |
| 13 | $CH_3$ | $CH_3$ | $CH_3CHCH_2-$ with $OH$ | $C_{11}H_{23}-$ |
| 14 | $CH_3$ | $CH_3$ | $C_6H_{13}CHCH_2-$ with $OH$ | $C_{11}H_{23}-$ |
| 15 | $CH_3$ | $CH_3$ | $C_8H_{17}OCH_2CHCH_2-$ with $OH$ | $C_{11}H_{23}-$ |
| 16 | $CH_3$ | $CH_3$ | $C_4H_9-\phenyl-OCH_2CHCH_2-$ with $OH$ | $C_{11}H_{23}-$ |
| 17 | $CH_3$ | $C_2H_5$ | $C_{12}H_{25}O(C_2H_4O)_4CH_2CHCH_2-$ with $OH$ | $C_7H_{15}-$ |
| 18 | $CH_3$ | $CH_3$ | $HOCH_2CH_2-$ | $C_{15}H_{23}-$ |

Compounds of the general formula (II)

| Exemplification number | $R_1$ | $R_2$ | $R_3$ | $R_4$ | A |
|---|---|---|---|---|---|
| 19 | $CH_3$ | $CH_3$ | $CH_3$ | $CH_3$ | I |
| 20 | $CH_3$ | $CH_3$ | $CH_3$ | $C_9H_{19}$ | I |
| 21 | $CH_3$ | $CH_3$ | $CH_3$ | $C_{11}H_{23}$ | Br |
| 22 | $CH_3$ | $CH_3$ | $CH_3$ | $C_{15}H_{31}$ | I |
| 23 | $CH_3$ | $CH_3$ | $CH_3$ | $C_{15}H_{31}$ | Cl |
| 24 | $CH_3$ | $CH_3$ | $CH_3$ | $C_{15}H_{31}$ | Br |
| 25 | $CH_3$ | $CH_3$ | $CH_3$ | $C_{15}H_{31}$ | I |
| 26 | $CH_3$ | $CH_3$ | $CH_3$ | $C_{15}H_{31}$ | $ClO_4$ |
| 27 | $CH_3$ | $CH_3$ | $CH_3$ | $C_{15}H_{31}$ | $BF_4$ |
| 28 | $CH_3$ | $CH_3$ | $C_2H_5$ | $C_{15}H_{31}$ | $BF_4$ |
| 29 | $CH_3$ | $CH_3$ | $-CH_2-\phenyl$ | $C_{15}H_{31}$ | $ClO_4$ |
| 30 | $CH_3$ | $CH_3$ | $-CH_2-\phenyl(Br)$ | H | Br |
| 31 | $CH_3$ | $CH_3$ | $-CH_2-\phenyl(CH_3)$ | H | Br |
| 32 | $CH_3$ | $CH_3$ | $-CH_2-\phenyl(Cl)$ | H | Cl |
| 33 | $CH_3$ | $CH_3$ | $-CH_2-\phenyl(NO_2)$ | H | Cl |
| 34 | $CH_3$ | $CH_3$ | $-CH_2-\phenyl(CF_3)$ | H | Br |
| 35 | $CH_3$ | $CH_3$ | $-CH_2-\phenyl(Br)$ | $CH_3$ | Br |
| 36 | $CH_3$ | $CH_3$ | Same as above | $C_3H_7$ | Br |
| 37 | $CH_3$ | $CH_3$ | do | $C_5H_{11}$ | Br |
| 38 | $C_2H_5$ | $C_2H_5$ | $CH_3$ | $C_{11}H_{23}$ | I |
| 39 | $C_2H_5$ | $C_2H_5$ | $CH_3$ | $C_{15}H_{31}$ | I |
| 40 | $C_2H_5$ | $C_2H_5$ | $C_2H_5$ | $C_{11}H_{23}$ | I |
| 41 | $C_2H_5$ | $C_2H_5$ | $C_2H_5$ | $C_{15}H_{31}$ | I |

The above-mentioned compounds can be synthesized according to the processes disclosed in The Journal of the Chemical Society, 2264 (1964); The Journal of the Organic Chemistry, 24, 660 (1959) and 33 1374 (1968); and specification of United States Patent 3,064,051 (1962).

The solvents used in the present invention in order to dissolve any of the above-mentioned antistatic agents are at least two kinds of substantially water-immiscible organic solvents lower in specific gravity than a protective colloid material, each of said organic solvents being at least one member selected from either one of the groups A and B mentioned below. These solvents should be lower in specific gravity than a protective colloid substance which remains when a protective colloid solution has been dried.

The organic solvents of the group A are phthalate type solvents such as dimethyl phthalate, dibutyl phthalate, etc.; phosphate type solvents such as triphenyl phosphate, tricresyl phosphate, tributylphenyl phosphate, etc.; and pyrrolidone type solvents such as oleyl pyrrolidone, lauroyl pyrrolidone, etc.

The organic solvents of the group B are monohydric or polyhydric alcohols which are high in boiling point (more than 100° C.), low in specific gravity (less than 1.3 when gelatin is used as the protective colloid substance, and ordinarily less than 1.0), and substantially immiscible in surface active agents used at the time of dispersing the aforesaid antistatic agents. Typical examples of such organic solvents are benzyl alcohol, n-octyl alcohol, 2-ethylhexyl alcohol, n-decanol, heptadecanol and glycerol. By use of the solvents of the group B, it has become possible that the antistatic agents are dispersed in large amounts and the resulting dispersions are not deteriorated in transparency during storage.

The protective colloid substance used in the present invention may be any of the known protective colloid substance, and typical examples thereof are gelatin, agar and polyvinyl alcohol. These may be used either alone or in the form of a mixture, or in admixture with a synthetic resin. The protective colloid substance is dissolved in a suitable solvent such as water or the like and is used as a protective colloid solution.

The antistatic dispersion of the present invention is prepared by dissolving the aforesaid antistatic agent in the aforesaid two kinds of organic solvents lower in specific gravity than the protective colloid substance and then dispersing the resulting solution in the protective colloid solution by use of a suitable disperser. In this case, the mixing ratio of the organic solvent A to the organic solvent B is desirably 1 to 0.05 or more; the amount of the antistatic agent is desirably from 0.05 to 5 parts per 10 parts of the mixed solvent (A and B); and the protective colloid solution is preferably at a concentration of about 0.5% to 15%. The ratio of the solution of the antistatic agent in said mixed solvent to the protective colloid solution varies depending on whether the resulting antistatic dispersion is applied as it is to an insulator or applied thereto after dilution, and is ordinarily selected from the range of 1:1 to 1:30.

The antistatic dispersion obtained in the above manner is applied to the surface of an insulator in a proportion of 0.1 to 50 cc. per m.$^2$ of the insulator surface. In case it is desired to add the antistatic dispersion to any of the layers of a light-sensitive photographic material, it is used in such an amount that the above-mentioned proportion can be attained after coating. Examples of the light-sensitive photographic material used in the above case are light-sensitive silver halide color photographic materials, light-sensitive silver halide black-and-white photographic materials light-sensitive silver halide roentgenographic materials and the like light-sensitive materials having photosensitive layers on one or both sides. The dispersion of the present invention does not injure the photographic properties of the above-mentioned light-sensitive photographic materials.

In order to stably and uniformly disperse the antistatic agent solution into the protective colloid solution, a surface active agent may be used. The surface active agent includes all of nonionic, amphoteric, cationic and anionic surface active agents. Among these, the anionic and nonionic surface active agents are particularly excellent. The antistatic agent solution is stably dispersed in the protective colloid solution when at least 2 parts, per 10 parts of the antistatic agent solution, of a 5% solution of the surface active agent is used in combination therewith.

When the antistatic dispersion is stored in the form of a gel formed by using gelatin as the protective colloid substance, uniformly dispersing by use of an ultrasonic disperser or similar disperser can be used to disperse the aforesaid antistatic agent solution and surface active agent solution into the aqueous gelatin solution, and then cooling the resulting dispersion, there results such marked convenience that the dispersion may be used as occasion demands by redissolving the gel in a required amount.

The particles of the antistatic dispersion are ordinarily 0.1 to 30$\mu$, preferably less than 5$\mu$, in particle size. Thus, the dispersion can be uniformly dispersed in the protective colloid solution.

An insulator, to which has been applied the thus prepared antistatic dispersion of the present invention, is not only successfully prevented from electrification phenomenon derived from contact or friction with or peeling off from various materials but also effectively displays its characteristics for a long period of time without becoming deteriorated in antistatic effect due to environmental conditions or to water-washing and like treatment.

The present invention is illustrated in further detail below with reference to examples.

Example 1

10 Parts of tricresyl phosphate as the organic solvent A was mixed with 3 parts of n-decanol as the organic solvent B. In this mixed solvent was dissolved at an elevated temperature 0.7 parts of the antistatic agent of exemplification No. (3). The resulting solution was mixed with 10 parts of an anionic surface active agent (5% aqueous solution) and 45 parts of a 5% aqueous gelatin solution, and then dispersed by use of an ultrasonic disperser. The dispersed particles in the resulting dispersion were less than 2$\mu$ in size. This dispersion was gelled at a low temperature and then stored.

Separately, a dispersion was prepared in the same manner as above, except that the n-decanol was not used. This dispersion was also gelled and stored.

Each of the gelled dispersions was redissolved and then added to a protective coating liquid for light-sensitive photographic material. Subsequently, the protective coating liquid was coated on both sides of a light-sensitive photographic material having sensitive layers on both sides so that the proportion of the dispersion became 1 to 20 cc. per m.$^2$ of the photographic material, and then dried to prepare a light-sensitive photographic material having antistatic dispersion layers on both sides.

The thus prepared photographic materials were moistened by allowing them to stand at 20 to 60% RH for 5 hours, rubbed with a rubber or nylon-teflon cloth, and then developed to examine whether or not static marks are formed. As the result, no formation of static marks was observed in the photographic materials having antistatic dispersion layers.

In order to examine the deterioration in transparency during storage of the above-mentioned dispersions in the form of gels, each gelled dispersion after storage for a definite period of time was added to the aforesaid protective coating liquid, and only the said protective coating liquid was coated on a support (polyester base) for light-sensitive photographic material, and then dried. The results of measurement in transparency of the protective coating liquid coated on said support were as set forth in Table 1.

TABLE 1

| n-Decanol | Storage time of gelled dispersion, hours | Transparency |
|---|---|---|
| 0 part | 12 | Somewhat low. |
| Do | 24 | Low. |
| Do | 48 | Low. |
| 3 parts | 12 | Excellent. |
| Do | 24 | Do. |
| Do | 48 | Do. |
| Do | 72 | Do. |

The gelled dispersions did not become deteriorated in antistatic effect during storage.

Example 2

10 Parts of tricresyl phosphate as the organic solvent A was mixed with each of 3 parts of n-octyl alcohol, 3 parts of 2-ethylhexyl alcohol, 2 parts of glycerol and 5 parts of 1-heptadecanol to form 4 kinds of mixed organic solvents. In each of the thus formed mixed organic solvents was dissolved at an elevated temperature 0.6 part of each of the compounds of exemplification Nos. (3), (6), (8) and (11). The resulting solution was mixed with 11 parts of an anionic surface active agent and 40 parts of a 7% aqueous gelatin solution, and then dispersed by use of an ultrasonic disperser. The dispersed particles in the resuting dispersions were less than about 2$\mu$. These dispersions were gelled at a low temperature and then stored.

Each of the gelled dispersions was redissolved and then added to a protective coating liquid for light-sensitive material. Subsequently, the protective coating liquid was coated on both sides of a light-sensitive photographic material having sensitive layers on both sides so that the proportion of the dispersion became 1 to 10 cc. per m.$^2$ of the photographic material, and then dried to prepare a light-sensitive photographic material having antistatic dispersion layers on both sides.

In the same manner as in Example 1, the thus prepared photographic materials were examined in antistatic effect and the gelled dispersions were examined for transparency. As a result, no formation of static marks was observed in the photographic materials and no deterioration in transparency of the dispersions was observed.

Example 3

10 Parts of dibutyl phthalate as the organic solvent A was mixed with 2 parts of n-octyl alcohol. In this mixed solvent was dissolved at an elevated temperature 0.8 part of each of the antistatic agents of exemplification Nos. (3), (8), (11), (23) and (29). The resulting solutions were individually mixed with 10 parts of an anionic surface active agent (5% aqueous solution) and 40 parts of a 5% aqueous gelatin solution, and then dispersed by use of an ultrasonic disperser. Thereafter, the resulting solutions were gelled and stored.

Each of the gelled dispersions was redissolved and then added to a protective coating liquid for light-sensitive photographic material. Subsequently, the protective coating liquid was coated on a light-sensitive photographic material so that the proportion of the dispersion became 1 to 20 cc. per m.² of the photographic material.

In the same manner as in Example 1, the thus prepared photographic materials were examined in antistatic effect and the gelled dispersions were examined in transparency. As the result, it was found that the photographic materials were excellent in antistatic effect, and the dispersions were excellent and did not deteriorate in transparency.

The same results above were obtained when each of n-decanol, heptadecanol, 2-ethylhexyl alcohol, benzyl alcohol and cresol was used as the organic solvent B in place of the n-octyl alcohol.

What we claim is:

1. An antistatic dispersion which comprises a protective colloid solution havnig dispersed therein a solution of an antistatic agent in at least two kinds of water-immiscible organic solvents having a lower specific gravity than the protective colloid substance, one kind of said solvents being selected from the Group A consisting of organic solvents of the phthalate, pyrrolidone and phosphate types and the other being selected from Group B consisting of benzyl alcohol, n-octyl alcohol, 2-ethylhexyl alcohol, n-decanol, heptadecanol, and glycerol wherein the antistatic agent is a compound selected from the group consisting of antistatic compounds having the general formulas

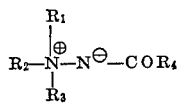

and

wherein $R_1$, $R_2$ and $R_3$ individually mean an alkyl or aralkyl group; $R_4$ is an alkyl group, an aryl group or a hetero ring; and A is a halogen atom or a group $XO_4$ or $BX_4$ where X is halogen.

2. An antistatic dispersion according to claim 1 wherein the Group A solvent is selected from the group consisting of dimethyl phthalate, dibutyl phthalate, oleyl pyrrolidone, lauryl pyrrolidone, tri-phenyl phosphate, tricresyl phosphate and tributylphenyl phosphate.

3. An antistatic dispersion according to claim 1, wherein the protective colloid solution is an aqueous solution of a protective colloid substance selected from the group consisting of gelatin, agar and polyvinyl alcohol.

4. An antistatic dispersion according to claim 1, insluding a surface active agent.

5. An antistatic composition which comprises an aqueous gelatine solution containing an anionic surface active agent and, dispersed therein, a solution of a compound of the formula

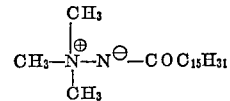

or

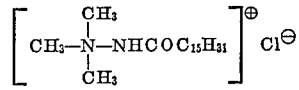

in a mixture of tricresyl phosphate and n-decanol.

References Cited
UNITED STATES PATENTS

| | | | |
|---|---|---|---|
| 2,461,474 | 12/1946 | Kaszuba | 96—87 A |
| 3,096,305 | 7/1963 | Laakso et al. | 96—87 A |
| 3,736,268 | 5/1973 | Habu et al. | 96—87 A |
| 3,704,128 | 11/1972 | Koda et al. | 96—114 Z |
| 2,322,027 | 6/1943 | Jelley et al. | 96—74 |

FOREIGN PATENTS

| | | | |
|---|---|---|---|
| 975,006 | 11/1964 | Great Britain | 96—87 A |

RONALD H. SMITH, Primary Examiner

U.S. Cl. X.R.

96—87 A, 114.2